United States Patent Office 3,401,550
Patented Sept. 17, 1968

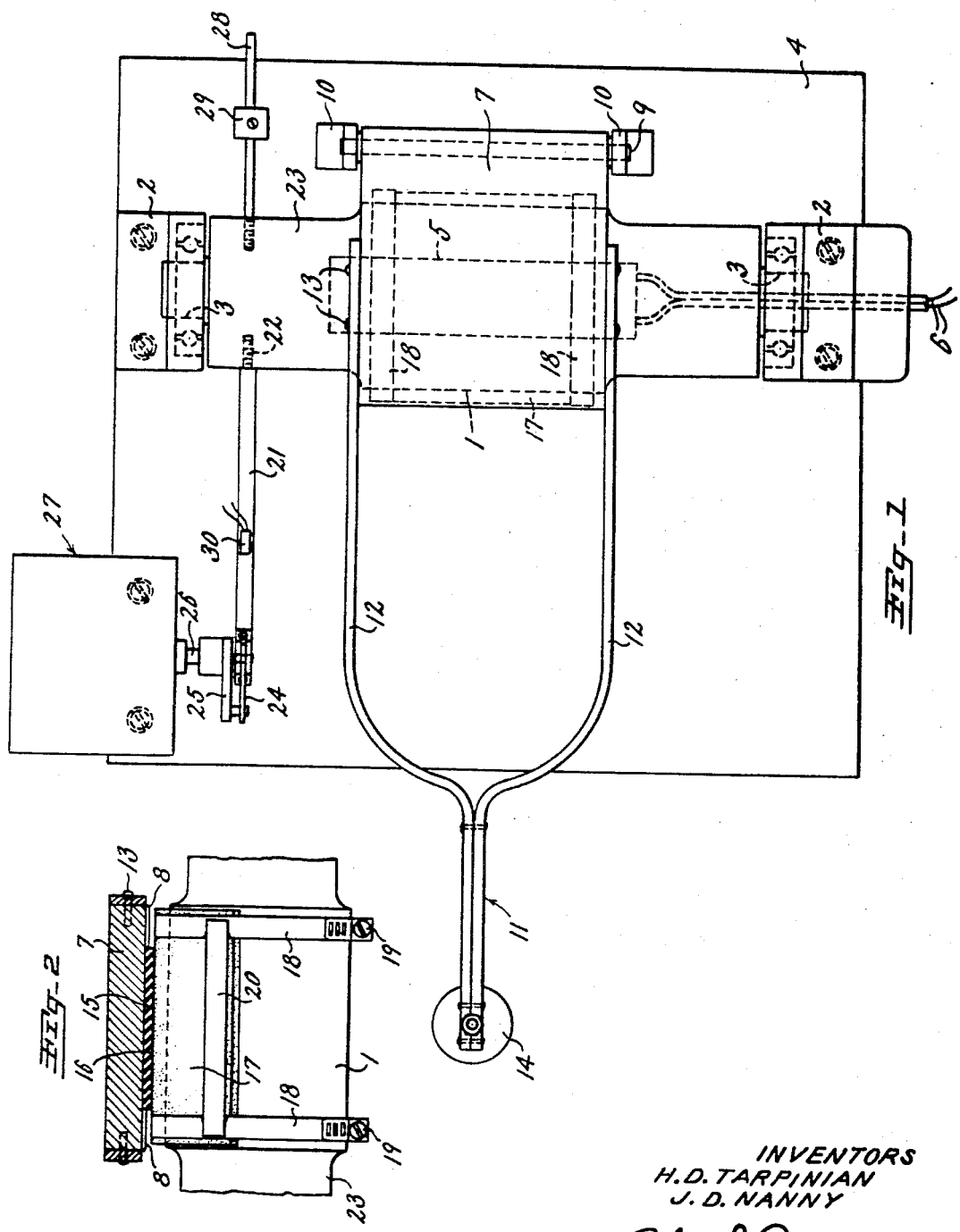

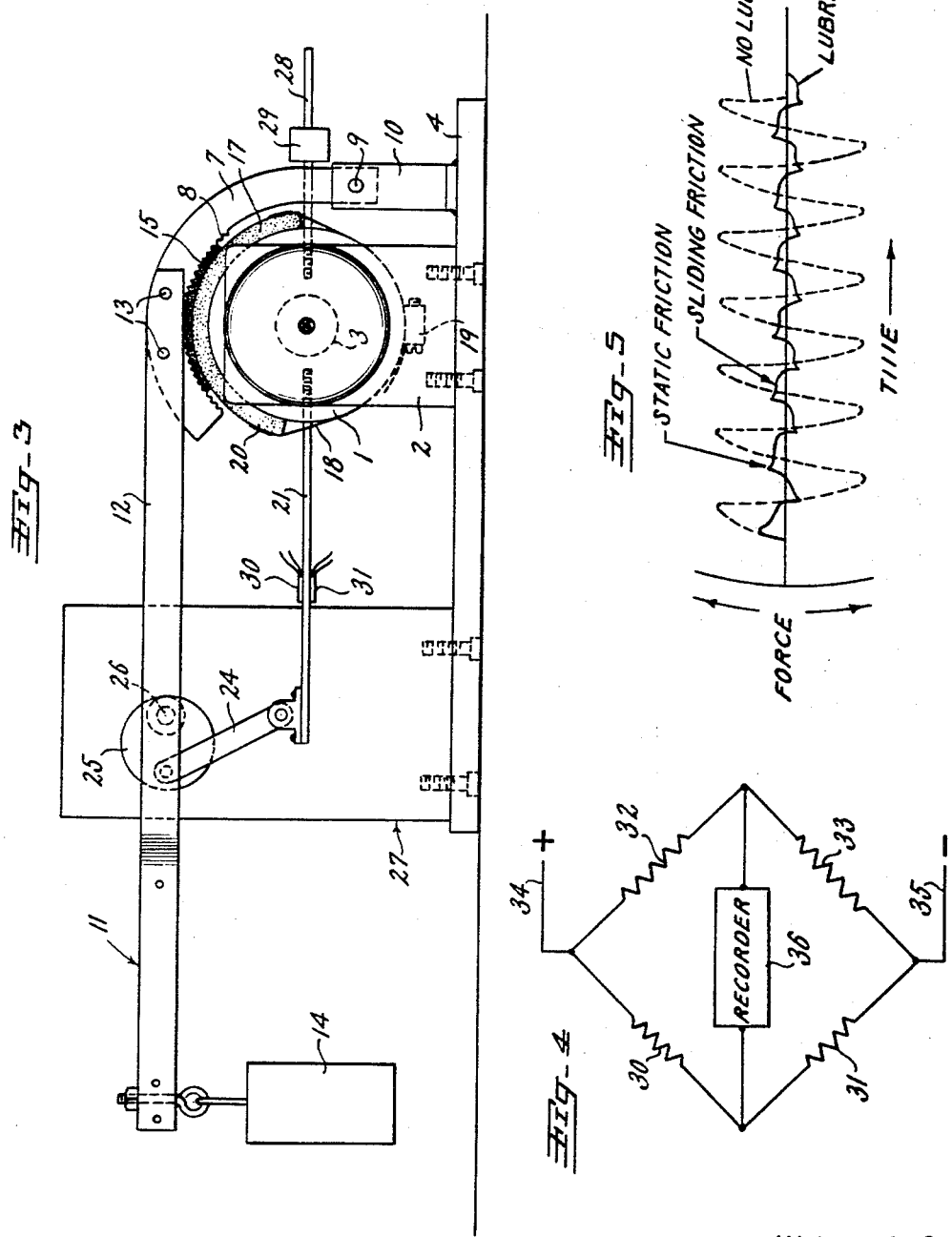

3,401,550
LUBRICITY TESTER
Haig D. Tarpinian, Grosse Pointe, and James D. Nanny, Detroit, Mich., assignors to Uniroyal, Inc., a corporation of New Jersey
Filed June 8, 1966, Ser. No. 556,167
7 Claims. (Cl. 73—10)

ABSTRACT OF THE DISCLOSURE

An apparatus for measuring the effectiveness of lubricants to be used between a curing bag and the liner of a tire which is being cured. A piece of curing bag stock and a piece of tire liner stock are positioned in sliding, face to face contact with each other, with only the lubricant to be tested disposed therebetween. The rubbery bag and liner stocks are located respectively on the surface of a cylindrical mandrel and on an opposing surface of a cooperating stator member. The stator is urged toward the mandrel, thereby pressing the opposing stocks against each other, while the mandrel and the stock thereon are oscillated with respect to the stock on the stator. The torque required to thus rotate the mandrel is measured.

---

This invention relates to a simple and effective instrument for measuring the effectiveness of so-called bag lubricants which are lubricants used to effect proper lubrication between a curing bag and the liner (the air-impermeable inside rubber layer) of tires which are being cured. Such lubrication is important because it facilitates movement of the bag relative to the tire during the curing operation.

Proper lubrication between the bag and the liner is important for successful curing of pneumatic rubber tires. The usual method of evaluating new or experimental lubricants requires a trial in the factory. Factory trials are expensive and time-consuming. Our instrument provides a simple means of evaluating bag lubricants in the laboratory.

The instrument of our invention comprises a rotating cylindrical electrically heated mandrel adapted to receive and retain on its outer surface a section of the curing bag material, an arcuate stator which is pivoted at one end and is concentric with the mandrel and adapted to receive on its inner surface, preferably as a result of the inner surface being serrated, a section of the liner material (this usually being uncured although it can be in any desired state of cure) and to retain the liner material in sliding contact with the outer surface of the section of curing bag material as the latter is rotated as a result of rotation of the mandrel, a rigid lever arm fixedly attached to the stator and extending generally horizontally therefrom in a direction away from the pivoted end of the stator, an adjustable weight carried on the outboard end of the lever arm, this weight typically being adjusted by substitution of varying weights although it could be adjusted by moving it along the arm, driving means for rotating the mandrel in an oscillatory motion about the central axis of the mandrel, strain gauge means associated with the driving means for measuring the torque required to rotate the mandrel, means in electrical circuit with the strain gauge means for generating an electrical output signal which is an electrical analog of the frictional force between the section of curing bag material and the section of liner material when the lubricant being tested is disposed therebetween, and means for recording the electrical output signal.

In the accompanying drawings:

FIG. 1 is a plan view of the testing instrument;

FIG. 2 is a detailed view, partly in section, showing the arrangement of the liner sample and the bag sample with respect to the mandrel and the stator;

FIG. 3 is a side view of the instrument;

FIG. 4 is a wiring diagram for the strain gauges and the force-recording device; and FIG. 5 shows typical force-recordings.

Referring to FIGS. 1 through 3, the cylindrical mandrel 1 is rotatably supported by supports 2 and bearings 3 on base 4. The central enlarged portion of mandrel 1 is electrically heated by a conventional electrical heating unit 5 supplied with current by wires 6 and located in the center of mandrel 1.

Disposed concentrically with reference to mandrel 1 is a semi-circular stator 7 which, like mandrel 1, is substantially constructed from solid metal, preferably aluminum, so that it will not yield appreciably during the testing procedure and thereby make the test results unreliable. Stator 7 is pivoted at its lower end so as to freely rotate about shaft 9 which is rigidly carried by supports 10 on base 4.

A rigid lever arm 11 is formed of two flat metal members 12 which are rigidly fastened to the opposite sides of stator 7 by screws 13 and converge at their outboard ends where they are secured together by suitable fastening elements. A changeable weight 14 is carried on the outboard end of lever 11 in the obvious manner.

The sample of liner stock 15 is held securely with respect to stator 7 by the serrations 8 which are milled longitudinally in the inner face of the stator so that it does not move during the testing. The bag stock sample 17 is securely held in place on mandrel 1 by two mandrel-encircling clamps 18 which are adjusted by means 19 and which are longitudinally positioned by integral connector 20. The bag stock sample 17 is preferably considerably larger in size than the liner stock sample 15 as shown.

Mandrel 1 is rotated about its central axis in an oscillatory motion to effect the test. In the drawings this is shown as achieved by the provision of rigid generally flat beam member 21 which extends radially generally horizontally and is fixedly received at 22 in somewhat reduced end portion 23 of mandrel 1. The outboard end of beam 21 is moved up and down by link element 24, the upper end of which is actuated by pivotal connection with crank member 25 which is fixedly attached to shaft 26. Shaft 26 is driven by drive unit 27 comprising an electric motor (not shown in detail) and a gear reduction unit (also not shown in detail).

Projecting radially from the other side of reduced end 23 of mandrel 1 is a beam 28 which carries counterweight 29 which is adjustable in position along the beam so as to impart the proper smoothness to the unit when in use. Beams 21 and 28 are preferably arranged, as shown, as extensions of a diameter of portion 23.

Two strain gauges 30 and 31 are secured in any suitable manner on the top and bottom, respectively, of beam 21 at a suitable intermediate position adjacent the middle thereof. These strain gauges are attached, as by cementing with an epoxy adhesive, to the oscillating beam 21 at a location where they measure the bending of the beam. As beam 21 is oscillated to turn mandrel 1, one of the strain gauges is subjected to tension while the other is subjected to compression. Thus as the beam deforms it produces changes in the resistances of the strain gauges. Any standard strain gauges, for example those of the wire type, foil type, or semiconductor type, can be used.

As indicated in FIG. 4, strain gauges 30 and 31 are connected as legs of a Wheatstone bridge, fixed resistances 32 and 33 of suitable ohmage being incorporated in the Wheatstone bridge circuit and an appropriate D.C. voltage being impressed on lines 34 and 35. The voltage difference produced by the increase in resistance of one strain gauge and the decrease in resistance of the other as beam 21 is oscillated is representative of the force required to oscillate mandrel 1 and therefore of the lubricating effectiveness of the lubricant being tested which is interposed between liner stock 15 and bag stock 17, the film of the lubricant being indicated by 16 (FIG. 2). The output signal of strain gauges 30 and 31 is an electrical analog of the frictional force between the bag stock and the liner stock and this analog is recorded in any known manner by recorder 36. Any commercial recorder such as an Offner 2-channel direct writing galvanometric recorder may be used for the purpose. If desired, a known strain gauge coupler, such as an Offner strain gauge coupler, may be used in electrical circuit with strain gauges 30 and 31, such a coupler providing the desired voltage which serves as the excitation for the electric bridge, the other two legs of the bridge and balance device being incorporated within the coupler. The electrical circuitry for our instrument and the details of the recording means do not require further description because they are entirely within the skill of ordinary workers in the art.

We have obtained excellent results using bag sample dimensions of 4" x 6" x 0.250", liner sample dimensions of 1" x 2" x 0.100" and with the rate of motion and amplitude of motion of mandrel 1 fixed at a rotational frequency of 4½ cycles per minute through an 18° arc. The temperature of mandrel 1 may be varied easily from room temperature to 300° F. in the obvious way by means of electrical heating element 5 which is positioned entirely within the mandrel 1 so that the heat developed thereby is rapidly and efficiently transmitted to the surface of mandrel 1.

Referring now to the typical force-recordings of FIG. 5, the force variation is periodic because of the reciprocating motion of the mandrel 1. The recordings show that a static and a sliding coefficient of friction exist. In the absence of lubricant, the force required to move mandrel 1 is roughly proportional to the shear modulus of liner stock 15, this being apparent in the dotted curve of FIG. 5. The effect of a commercial lubricant is shown in the solid curve of FIG. 5; in this case, the shear force increases until the lubricant can no longer support additional force and then the liner stock slides over the bag stock at an approximately constant force level. A similar phenomenon occurs in the reverse direction of motion as is seen by comparing the curve below the horizontal line in FIG. 5 with that above it.

In rating lubricants for usefulness under commercial conditions, we find that three parameters are analytically related, these three being: sliding friction, first cycle; sliding friction, fifth cycle; and static friction, fifth cycle; the ordering of these three parameters is nearly identical and for this reason only one of these three parameters need be considered as a criterion for quality of lubrication. The three measurements for these parameters reproduce within plus or minus ½ lb. of force which is sufficient to assure reliable test results.

We have found that the lubricity ratings for various bag lubricants as determined in the laboratory using our instrument correlate exactly with the empirical ratings given by experienced workers in the factory to the same lubricants. In addition, the testing device of our invention is simple to operate, is easy to maintain and requires no special training on the part of the operator in order to get quick and highly reproducible results.

In a typical test procedure, we use a normal force between liner and bag stocks of approximately 25 pounds, a bag surface temperature of approximately 220° F., and one application of lubricant to liner, the lubricant being allowed to dry on the liner sample prior to testing, the liner and bag dimensions being as set forth above and the rotation of the mandrel being through an 18° arc at a frequency of 4½ cycles per minute. New samples of liner and bag stocks are introduced for each lubricant which is tested with our instrument.

Having thus described our invention, what we claim and desire to protect by Letters Patent is:

1. An apparatus for measuring the effectiveness of lubricants used between the curing bag and the inner air-retaining liner of a tire undergoing vulcanization, comprising:
   a rotatable cylindrical mandrel;
   a first flexible sheet section of rubbery material;
   means securing said first sheet section to the outer surface of said cylindrical mandrel, with said sheet section conforming substantially to the shape of said outer surface;
   a stator member supported for substantially radial movement with respect to said mandrel and having an inner surface substantially concentric with said outer surface of said mandrel;
   a second flexible sheet section of rubbery material disposed on and generally conforming to the shape of said inner surface of said stator, one of said sheet sections closely resembling curing back stock and the other of said sections closely resembling tire air-retaining-liner stock;
   holding means provided on said stator and engaging said second section for preventing relative sliding movement between said stator and said second section;
   urging means cooperating with said stator for urging the latter toward said mandrel, so as to urge the inner surface of said second section into direct engagement with the outer surface of said first section;
   driving means associated with said mandrel for rotating the latter in an oscillatory motion about its central axis; and
   measuring means associated with said driving means for measuring the torque required to rotate said mandrel, so as to provide an indication of the frictional force between said outer surface of said first and said inner surface of said second sheet sections when a lubricant to be tested is disposed therebetween.

2. The apparatus according to claim 1 wherein the material of said other sheet section is rubber in other than fully cured condition.

3. The apparatus according to claim 1 wherein said holding means comprises longitudinal serrations on said inner surface of said stator, said serrations being adapted to grip the outer surface of said second sheet section.

4. The apparatus according to claim 1, wherein said urging means comprises a rigid lever arm fixedly attached to said stator and extending generally horizontally therefrom; pivot means pivotally supporting said stator at the end thereof spaced from said lever arm; and an adjustable weight carried in the region of the free end of said lever arm.

5. The apparatus according to claim 4, wherein said driving means comprises a beam extending radially outwardly from and rigidly secured to said mandrel, and means connected to the outboard end of said beam for moving the same and said mandrel in an oscillatory motion, said measuring means comprising a pair of strain gauges secured to said beam intermediate said outboard end thereof and said mandrel, one of said strain gauges being mounted on one side of said beam and the other being mounted on the other side thereof in the plane of oscillation of said beam in such manner that one of said strain gauges is increased in electrical resistance while the other is decreased in electrical resistance as the beam rotates the mandrel in an oscillatory motion.

6. The apparatus according to claim 5 wherein said measuring means further comprises indicator means including an electrical circuit connected with said strain gauges for generating an electrical output signal which is an electrical analog of the frictional force between the contacting surfaces of said first and second sheet sections, said apparatus further comprising electrical heating means cooperating with said mandrel for heating the latter so as to simulate actual tire vulcanization conditions.

7. The apparatus according to claim 1 wherein said securing means and said holding means are adapted to, respectively, releasably secure said first sheet section to said mandrel and releasably hold said second sheet section against sliding movement with respect to said stator whereby both said sections of rubbery material can be readily removed after a test of a lubricant therebetween and replaced by other similar sections of rubbery material for testing of another lubricant sample without the condition of the contacting surfaces during such latter test being influenced by the previously tested lubricant.

References Cited

UNITED STATES PATENTS

| | | | |
|---|---|---|---|
| 154,922 | 9/1874 | Stapfer | 73—10 |
| 214,132 | 4/1879 | Higginson | 73—10 XR |
| 1,777,423 | 10/1930 | Zeder | 73—9 |
| 2,031,253 | 2/1936 | Davis | 73—10 |
| 2,114,029 | 4/1938 | Perry. | |
| 2,429,055 | 10/1947 | Griffin | 73—7 |
| 2,887,874 | 5/1959 | Mason | 73—9 |
| 2,957,335 | 10/1960 | Dmitroff | 73—10 |

DAVID SCHONBERG, *Primary Examiner.*

JEFFREY NOLTON, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,401,550                  September 17, 1968

Haig D. Tarpinian et al.

It is certified that error appears in the above identified patent and that said Letters Patent are hereby corrected as shown below:

Column 4, line 23, "back" should read -- bag --.

Signed and sealed this 3rd day of February 1970.

(SEAL)
Attest:

Edward M. Fletcher, Jr.                 WILLIAM E. SCHUYLER, JR.

Attesting Officer                      Commissioner of Patents